Figure 1:
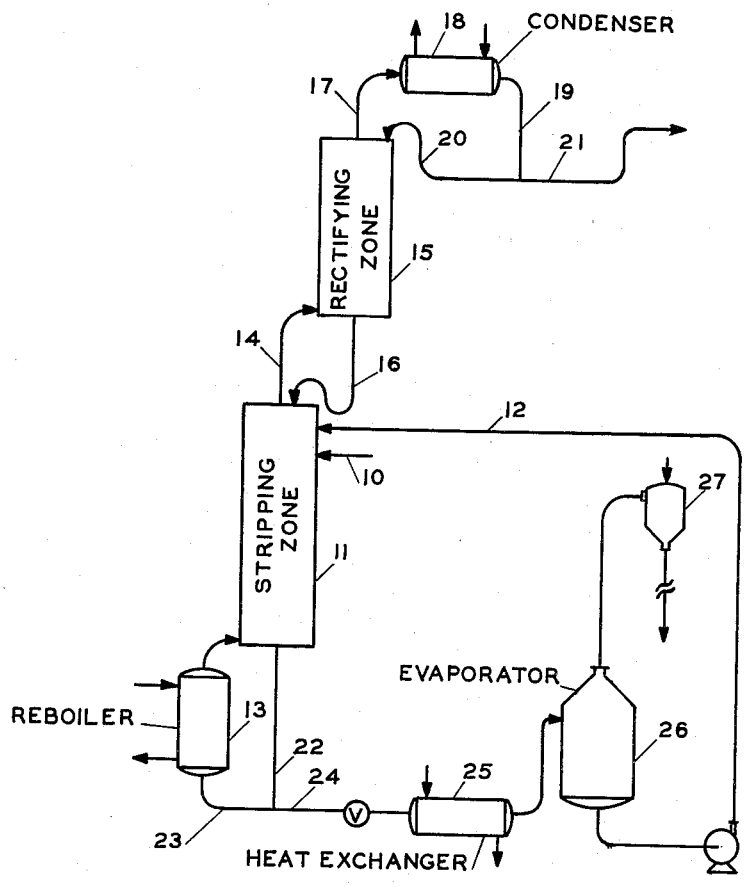

Re. 25,393

Aug. 30, 1955 — R. J. BECHTEL — 2,716,631

NITRIC ACID CONCENTRATION

Filed Nov. 3, 1951

ROBERT J. BECHTEL.
*INVENTOR.*

BY Ernest G. Peterson

AGENT

United States Patent Office 2,716,631
Patented Aug. 30, 1955

2,716,631

NITRIC ACID CONCENTRATION

Robert J. Bechtel, New Brunswick, N. J., assignor to Hercules Powder Company, Wilmington, Del., a corporation of Delaware Application November 3, 1951, Serial No. 254,768

7 Claims. (Cl. 202—68)

This invention relates to an improved process for concentrating nitric acid. In a specific aspect this invention relates to an improved continuous process for concentrating nitric acid by distilling a weak aqueous solution thereof in the presence of an alkaline earth metal nitrate.

There is a substantial commercial demand for concentrated nitric acid solutions, i. e., aqueous solutions of nitric acid containing at least 90% by weight nitric acid, for processes such as the nitration of hydrocarbons, the nitration of cellulose, and the like. It is a well-known fact that nitric acid and water form an azeotrope containing about 68% nitric acid and about 32% water. Much of the nitric acid produced commercially is in the form of an aqueous solution having a concentration of nitric acid less than 68%, and, consequently, such commercial products cannot be concentrated by simple fractional distillation.

A method employed commercially for the concentration of weak nitric acid solutions involves the use of concentrated sulfuric acid or oleum in a distillation process, and concentrated nitric acid is recovered from such distillation procedure as an overhead product. This process of concentrating nitric acid is extensively used commercially but it requires the operation of a sulfuric acid concentrator to reconcentrate the large amounts of weak sulfuric acid produced in the process. Also, the sulfuric acid-nitric acid-water mixture is very corrosive, requiring special costruction materials suitably resistant to the corrosive nature of this mixture. There is also an inefficiency in the process in that high heat losses occur when the spent or weak sulfuric acid leaves the nitric acid concentrator and when the hot reconcentrated sulfuric acid leaves the sulfuric acid concentrator.

Alkaline earth metal nitrates such as magnesium nitrate have been suggested for use in nitric acid concentration procedures. The procedure suggested heretofore involves the introduction of weak nitric acid solution and a concentrated solution of magnesium nitrate at the top of a fractional distillation zone. The overhead product from the fractional distillation of this mixture is concentrated nitric acid, and the bottoms product is a mixture of nitric acid, magnesium nitrate, and water. This bottoms product is then treated under reduced pressure to recover a weak nitric acid solution which is then fractionally distilled prior to recycling to the original fractional distillation zone. The presence of the nitric acid in the bottoms product from the first fractional distillation step makes necessary the use of a series of subsequent recovery steps in order to prevent the uneconomical loss of nitric acid. Obviously, a procedure that will produce a concentrated nitric acid solution and a magnesium nitrate solution substantially free of nitric acid is desirable and is a marked step forward when compared with the known prior art procedures.

It is an object of this invention to provide a novel and improved process for concentrating weak aqueous nitric acid solutions.

It is another object of this invention to provide a novel and improved process for concentrating weak nitric acid solutions employing an alkaline earth metal nitrate as a dehydrating ogent.

It is a further object of this invention to provide a novel and improved process for concentrating weak nitric acid solutions by fractional distillation in the presence of a magnesium nitrate solution as a dehydrating agent wherein the distillation bottoms product is substantially free of nitric acid.

Further and additional objects of this invention will be apparent from the detailed disclosure thereof hereinbelow.

The objects and advantages set forth above for this invention can be accomplished by a novel fractional distillation process of weak nitric acid solutions carried out in the presence of concentrated aqueous alkaline earth metal nitrate solutions. The weak nitric acid solution is introduced to a stripping zone and the concentrated alkaline earth metal nitrate solution is also added to the same stripping zone either along with or at a point not below the point of introduction of the nitric acid solution. Vapors from the stripping zone are passed to a rectification zone wihere further fractional distillation is effected. The overhead product from the rectification zone is a concentrated solution of nitric acid. Liquid bottoms product from the rectification zone is returned to the stripping zone and the bottoms product obtained from the stripping zone is a dilute solution of alkaline earth metal nitrate substantially free of nitric acid except for that produced by hydrolysis of the alkaline earth metal nitrate. This latter bottoms product can be concentrated by evaporating off a portion of the water therein, and tre resulting solution is ready for recycle to the stripping zone.

The following specific description of the invention serves as a specific example demonstrating one method of practicing the invention. A 60% nitric acid solution is fed to the stripping section of a fractional distillation zone at an intermediate point in the upper portion of the stripping section. A 72% solution of substantially pure magnesium nitrate is introduced to the stripping zone at a point between the point of introduction of the weak nitric acid solution and the top of the stripping section. Vapors containing about 87% nitric acid and the balance water are passed from the top of the stripping section to a point near the bottom of the rectification section. The overhead product from the rectification zone is passed through a suitable condenser and a portion of this product is recovered as 99% nitric acid. The unrecovered portion of the product is recycled to the rectification zone. The bottoms product from the rectification zone containing 75% nitric acid and 25% water is recycled to the top of the stripping section. A portion of the bottoms product leaving the stripping section is passed to a reboiler where it is heated to provide the necessary steam for the fractional distillation. The remaining bottoms product from the stripping section containing about 68% magnesium nitrate, about 28% water and not more than 0.1% free nitric acid is passed to a vacuum evaporator to drive off free nitric acid and a portion of the water. The 0.1% free nitric acid can be reduced to the hydrolysis equilibrium value by use of more plates in the stripping section or by evaporation, but it cannot be reduced below the equilibrium value which is about 0.04% nitric acid in the vapors from a 66% magnesium nitrate solution and about 0.35% nitric acid in the vapors from a 72% magnesium nitrate solution. The resulting 72% magnesium nitrate solution is then recycled to the stripping section for further use in the fractional distillation process.

Figures 2, 3:
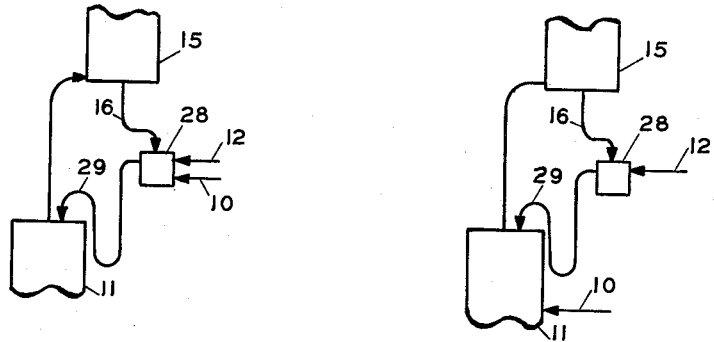

The invention will be described in further detail with reference to the accompanying drawings which are schematic drawings showing various methods of carrying out the concentration procedure. Fig. 1 is a diagrammatic flow sheet showing one method of concentrating nitric acid in accordance with the invention. Fig. 2 is a schematic drawing of a portion of the apparatus described in Fig. 1 which shows an alternative method of introducing the feed solutions to the fractional distillation. Fig. 3 is similar to Fig. 2 and it shows a second alternative method of introducing the feed solutions. Conventional equipment, such as temperature and flow control devices, and the like, has not been included in these drawings since the inclusion of such equipment is an obvious expedient within the scope of this invention.

Referring now to Fig. 1 of the accompanying drawings, a dilute nitric acid solution containing less than 68% by weight nitric acid, for example, one containing from 55% to 65% nitric acid, is introduced via line 10 into stripping section 11. A concentrated magnesium nitrate solution containing from 60% to 80%, preferably from 70% to 72%, magnesium nitrate is introduced to zone 11 via line 12. Zone 11 is provided at its base with a reboiler 13 through which a portion of the bottoms product from zone 11 is passed in order to supply the necessary steam and heat for the fractional distillation operation. Overhead vapors from zone 11 are passed via line 14 into rectification zone 15. These vapors contain about 87% nitric acid and about 13% water. Liquid bottoms product from zone 15 is returned to zone 11 via line 16. This bottoms product contains more than 68% and about 75% nitric acid and about 25% water. The overhead product from zone 15 is passed at a temperature of 86° C. via line 17 through condenser 18, and the liquid product is withdrawn via line 19. A portion of this liquid product is recycled via line 20 to zone 15, the reflux ratio being within the range of 2:1 to 3.5:1, but, if desired, ratios outside this range can be employed. The preferred reflux ratio is about 2.2 parts by weight returned as liquid reflux to each part withdrawn as product. The remaining liquid passing via line 19 is withdrawn from the system via line 21 as a concentrated nitric acid product containing, for example, at least from 95% and preferably 99.5% nitric acid.

Liquid bottoms product from zone 11 containing, for example, from 55% to 70% magnesium nitrate, not more than about 0.1% free nitric acid, and the remainder water, is withdrawn from zone 11 via line 22 at a temperature of from 140° to 190° C., depending on the pressure and the magnesium nitrate concentration. A portion thereof is passed via line 23 to reboiler 13 where it is heated and then returned to zone 11 to provide the necessary heat for the fractional distillation procedure. The remainder of the bottoms product from zone 11 is passed via line 24 and heat exchanger 25 to vacuum evaporator 26 wherein a portion of the water and free nitric acid are withdrawn through evaporator condenser 27 and then discarded from the system. The heat required for evaporation can also be supplied by heat exchanger 25 connected to evaporator 26 as a recirculating reboiler similar to reboiler 13. The resulting concentrated magnesium nitrate solution is then returned to zone 11 via line 12. The weight ratio of returned magnesium nitrate solution to weak nitric acid feed is at least 2.5:1 and such that the magnesium nitrate concentration in line 23 is not less than 55%. The preferred ratio for a 60% nitric acid feed is 6.9:1.

In the process set out in Fig. 2 an alternative method of introducing the feed solutions to the fractional distillation procedure is employed. In this alternative method the concentrated magnesium nitrate solution, the weak nitric acid solution, and the bottoms product from rectification zone 15 are all passed to mixing chamber 28 via lines 12, 10 and 16, respectively, prior to introduction of the mixture to stripping zone 11 via line 29. In some instances the use of this alternative procedure is desirable in order to obtain efficient and effective contacting of the feed solutions in zone 11. The magnesium nitrate solution is rather viscous, and mixing of the solution prior to introduction to zone 11 tends to prevent channeling of the solutions in that zone. By inhibiting the channeling, improved contacting of the feed solutions is obtained.

Fig. 3 depicts another alternative procedure that can be used to mix the magnesium nitrate solution and the bottoms product from zone 15 prior to introduction to zone 11. In this alternative procedure the weak nitric acid solution is introduced to zone 11 via line 10, as previously described in Fig. 1. The magnesium nitrate solution and the bottoms product from zone 15 are passed to mixing chamber 28 where the two solutions are thoroughly agitated and mixed prior to introduction to zone 11 via line 29. The mixing of the solutions in chamber 28 provides another method for preventing channeling caused by the high viscosity of the magnesium nitrate solution as previously described.

The stripping zone and rectifying zone can be either plate or packed fractional distillation columns. Also, the two columns can be made integral, if desired. The columns are preferably constructed of suitable chemical-resistant material, such as stainless steel lined with acid-resistant brick or steel lined with a protective membrane and acid-resistant brick.

From the above disclosure numerous alternative procedures and modifications within the scope of the invention will be apparent to those skilled in the art.

What I claim and desire to protect by Letters Patent is:

1. The method of concentrating a weak aqueous nitric acid solution which comprises fractionally distilling said nitric acid solution in a stripping zone and a rectifying zone, the introduction of said nitric acid solution being made to said stripping zone; introducing a concentrated aqueous solution of an alkaline earth metal nitrate to said stripping zone not below the point of introduction thereto of said nitric acid solution; passing vapors of nitric acid and water from the top of said stripping zone to said rectifying zone; passing a liquid solution of nitric acid and water from the bottom of said rectifying zone to the top of said stripping zone; recovering substantially all of the nitric acid entering said stripping zone in a concentrated aqueous solution from the top of said rectifying zone; and recovering a dilute aqueous solution of said metal nitrate substantially free of nitric acid from the bottom of said stripping zone.

2. The method of concentrating a weak aqueous nitric acid solution which comprises admixing said nitric acid solution with a concentrated aqueous solution of an alkaline earth metal nitrate; fractionally distilling the resulting admixture in a stripping zone and a rectifying zone, the introduction of said admixture being made to said stripping zone; passing vapors of nitric acid and water from the top of said stripping zone to said rectifying zone; passing a liquid solution of nitric acid and water from the bottom of said rectifying zone to said admixing step; recovering substantially all of the nitric acid entering said stripping zone in a concentrated aqueous solution from the top of said rectifying zone; and recovering a dilute aqueous solution of said metal nitrate substantially free of nitric acid from the bottom of said stripping zone.

3. The method of concentrating a weak aqueous nitric acid solution which comprises fractionally distilling said nitric acid solution in a stripping zone and a rectifying zone, the introduction of said nitric acid solution being made to said stripping zone; admixing a concentrated aqueous solution of an alkaline earth metal nitrate and liquid solution of nitric acid and water from the bottom of said rectifying zone; introducing resulting admixture to said stripping zone not below the point of introduction thereto of said weak nitric acid solution; passing vapors of nitric acid and water from the top of said stripping zone to said rectifying zone; passing a liquid solution of nitric acid and water from the bottom of said rectifying zone to said admixing step; recovering substantially all of the nitric acid entering said stripping zone in a concentrated aqueous solution from the top of said rectifying zone; and recovering a dilute aqueous solution of said metal nitrate substantially free of nitric acid from the bottom of said stripping zone.

4. The method of concentrating an aqueous nitric acid solution containing no more than 68% nitric acid which comprises fractionally distilling said nitric acid solution in a stripping zone and a rectifying zone, the introduction of said nitric acid solution being made to said stripping zone; introducing an aqueous magnesium nitrate solution, containing from 60% to 80% magnesium nitrate to said stripping zone not below the point of introduction thereto of said nitric acid solution; passing vapors of nitric acid and water from the top of said stripping zone to the bottom of said rectifying zone; passing a liquid solution of nitric acid and water from the bottom of said rectifying zone to the top of said stripping zone; recovering substantially all of the nitric acid entering said stripping zone in a concentrated aqueous solution containing at least 95% nitric acid from the top of said rectifying zone; and recovering an aqueous solution of magnesium nitrate more dilute than the magnesium nitrate solution introduced to said stripping zone and containing from 53% to 70% magnesium nitrate and not more than about 0.1% free nitric acid from the bottom of said stripping zone.

5. The method according to claim 4 wherein from 2 to 3.5 parts by weight of concentrated nitric acid recovered from the rectifying zone are recycled as liquid reflux to said rectifying zone to each part withdrawn as product.

6. The method according to claim 4 wherein the magnesium nitrate solution from the bottom of the stripping zone is concentrated by evaporation and recycled to said stripping zone.

7. The method of concentrating a weak aqueous nitric acid solution which comprises fractionally distilling said nitric acid solution in the presence of a concentrated aqueous solution of an alkaline earth metal nitrate in a stripping zone and a rectifying zone, the introduction of said nitric acid solution being made to said stripping zone; passing vapors of nitric acid and water from the top of said stripping zone to said rectifying zone; passing a liquid solution of nitric acid and water from the bottom of said rectifying zone to said stripping zone; recovering substantially all of the nitric acid entering said stripping zone in a concentrated aqueous solution from the top of said rectifying zone; and recovering a dilute aqueous solution of said metal nitrate substantially free of nitric acid from the bottom of said stripping zone.

References Cited in the file of this patent

UNITED STATES PATENTS

| | | |
|---|---|---|
| 2,463,453 | Beardsley | Mar. 1, 1949 |

FOREIGN PATENTS

| | | |
|---|---|---|
| 137,834 | Great Britain | Feb. 17, 1921 |
| 371,797 | France | Feb. 1, 1907 |
| 34,170 | Austria | Aug. 25, 1908 |
| 34,576 | Austria | Sept. 25, 1908 |